United States Patent Office 2,915,500
Patented Dec. 1, 1959

2,915,500

COPOLYMERS OF MONONUCLEAR PHENOLS, POLYOLS AND 3,9-DIALKENYLSPIROBI (M-DI-OXANES

Joseph E. Wilson, Highland Park, and Richard K. Walton, North Plainfield, N.J., assignors to Union Carbide Corporation, a corporation of New York No Drawing. Application December 27, 1956
Serial No. 630,742

8 Claims. (Cl. 260—47)

This invention relates to a new class of resins derived from phenols.

The classic phenolic resins are based on condensation products of phenol and formaldehyde. Such resins are usually made in two stages; the first stage being a partially condensed resin which further polymerizes during the molding cycle to form the familiar molded articles of commerce. As gases are released during such molding cycles, high molding pressures are required. Also molded articles of phenolic resin are somewhat brittle and lacking in resistance to impact.

We have discovered a new class of resins derived from phenols which cure without the release of gases to form hard and tough polymers. According to this invention such polymers are made by condensing a mixture of a mononuclear phenol and an aliphatic polyol with an unsaturated acetal. The unsaturated acetals may be formed by the reaction of acrolein or substituted acroleins with pentaerythritol. Such unsaturated acetals may be represented by the formula:

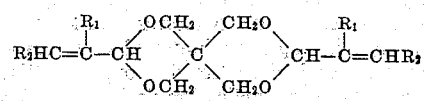

where $R_1$ is hydrogen, methyl or chlorine, and $R_2$ is hydrogen or methyl. The unsaturated acetal from acrolein and pentaerythritol, termed diallylidene pentaerythritol or 3,9-divinylspirobi(m-dioxane), is known to enter into resinification reaction with polyhydric alcohols in the presence of acidic catalysts. Such reactions proceed by the sequential addition of the vinyl groups of the acetal to the hydroxyl groups of the polyhydric alcohols to form a polyether.

While the polyol constituent of the reaction mixture reacts with the unsaturated acetal by addition of hydroxyl groups to the alkenyl groups, the phenolic hydroxyl groups do not add in this manner. Instead the phenols copolymerize with the vinyl groups of the acetals by means of the active hydrogen atoms of the phenols in the ortho and para positions. Thus, the polymerization mechanism, considering only the phenol addition, of the present invention may be represented as follows:

I.

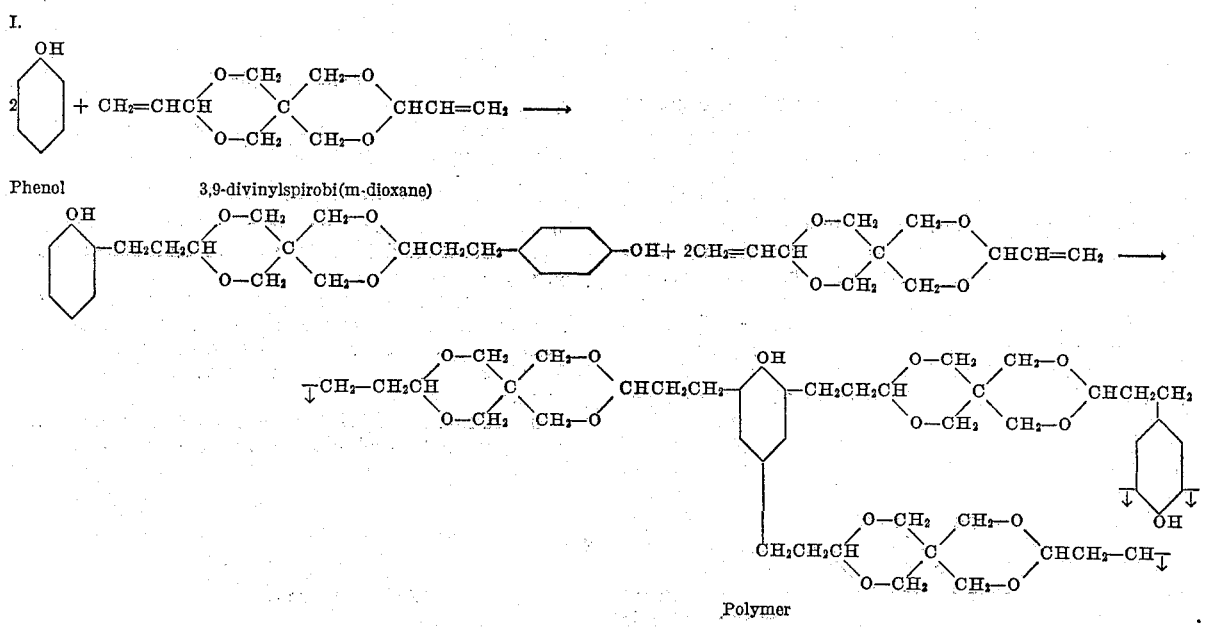

It should be noted that the above mechanism suggests the addition of the phenol to the terminal carbon atoms of the vinyl group. It is possible, of course, that the addition follows the rule of Markownikoff whereby the phenol would add to the olefinic carbon atom having the fewest hydrogen atoms, or in this instance the penultimate carbon atom of the acetal.

Regardless of the mode of the addition, all the available evidence indicates that the reaction between the phenols and the unsaturated acetals proceeds by the addition of the phenol at the reactive ortho and para positions to the vinyl group of the acetal.

In the first place, the unsaturated acetal does react with phenol to form a three-dimensional, thermosetting polymer network, which indicates that phenol functions as a trifunctional reactant, at least to a significant extent. In the second place, the mode of reaction represented by Equation I indicates a stoichiometric reaction between two moles of phenol and three moles of the spirobi compound; and it has been found experimentally that this is the optimum reactant ratio for the preparation of thermosetting polymers. If the stoichiometric ratio is departed from appreciably, the resulting product displays considerable thermoplasticity at 150°

C. In the third place, it was shown by means of a suitable chemical test for phenolic hydroxyl groups that the concentration of phenolic hydroxyl remains substantially undiminished during the course of the reaction. The chemical test used involves the reaction of a phenol with diazotized sulfanilic acid to form an intensely colored orange solution. The color intensity is proportional to the concentration of phenolic hydroxyl present in the unknown sample.

As indicated above, the polyol constituent of the reaction mixture will also contribute to the growth of the copolymer molecule by addition of hydroxyl groups to free vinyl groups to form ether linkages. Thus, phenol and diol copolymerization with the acetal, or with the growing macromolecule, will be going on simultaneously, but by different reaction mechanisms. For optimum polymer growth, consideration must be given to the functionality of the components of the reaction mixture. Thus, the unsaturated acetal has a functionality of two by virtue of its two vinyl groups; the phenol has a functionality of two or three depending on whether one active ortho or para position is substituted; and the functionality of the polyol is equal to the number of its hydroxyl groups. The unsaturated acetal should be reacted, for optimum polymer growth, in such proportions that the number of active groups in the assembly of acetal molecules will equal the number of active groups in the collection of phenol and polyol molecules. Thus a mixture of one mole of phenol and one mole of a diol will contain five active positions and should be reacted with 2.5 moles of the acetal which will also contain five active positions. Similarly a mixture of one mole of phenol and one mole of a triol will contain six active positions, and should be reacted with three moles of the divinyl acetal.

Resinification will occur, however, at less than the optimum ratios of reactants. Thus, the unsaturated acetal may be employed in amounts from about 0.25 to 4, and preferably from about 0.75 to about 1.25 times its equivalent weight as computed from the above functionality considerations. Preferably, the molar ratio of polyol to phenol in the reaction mixture will not exceed one.

The equivalent weight of a mononuclear phenol is its molecular weight divided by its functionality, and its functionality is the number of unsubstituted positions ortho or para to a phenolic hydroxyl group. There must be at least two such reactive positions open in the molecule for resinification to occur, and in a mixture of phenols, an average of at least two such reactive positions. The equivalent weight of the spirobi acetal is one-half its molecular weight.

As compared to the known resins formed solely from polyols and the divinylspirobi(m-dioxane), the copolymers of this invention are harder and less thermoplastic. As compared to polymers formed solely from phenols and the divinyl acetals, the copolymers of this invention are tougher and more resistant to impact at room temperature.

The resinification reaction between the monohydric phenols, the polyols and the divinylspirobi(m-dioxane) is catalyzed by acids or acid-reacting substances. Effective catalysts include strong acids, such as toluenesulfonic, benzenesulfonic, or sulfuric acids; and acid-reacting materials, such as diethyl sulfate. Less effective catalysts include weaker acids, such as phosphoric acids, or Lewis acids (electron accepting compounds), such as aluminum chloride, stannic chloride, ferric chloride, zinc chloride or titanium tetrachloride. As little as 0.1% acid, based on all reactants, will catalyze the initial reaction between the phenol, the polyol and the unsaturated acetal. However, the curing or hardening of the resin is accelerated by higher acid concentrations, of around 0.3%. Thus, the amount of acid may be varied, and suitable amounts include the range of from 0.01% to 2%.

Reaction between the phenols, the polyols and the unsaturated acetals may be initiated by simply mixing the reactants and catalysts and heating. Reaction temperatures may be 50° C. to 150° C., with the reaction time varying from about one hour at the lower temperature to a few minutes at the higher temperature. If desired, an inert diluent, such as an ether or a hydrocarbon may be used to facilitate handling the reaction mixture.

The initial reaction product, after removal of any inert diluent, is a heat-hardenable, fusible material. If allowed to stand at room temperature without neutralization of the catalyst, the material will eventually cure to a hard polymer. The curing reaction is accelerated by heating; a few hours being required at 70° C., and a few minutes at 150° C. The physical properties of the polymer, such as the heat distortion values, are improved by curing at the higher temperatures. Usually, therefore, the curing temperature will be higher than the initial reaction temperature. If the catalyst is neutralized with a base, such as sodium carbonate, calcium carbonate or sodium acetate, the resin will remain in the fusible state on standing. The neutralized fusible resins may be cured by adding additional acid and heating in the same manner. As previously noted, no gases are released during the curing cycle.

Any of the mononuclear phenols having at least two reactive positions are suitable for the reaction of this invention, such as phenol, mixed cresols, m-xylenol, p-phenylphenol, p-t-butylphenol, beta-naphthol, or mixtures of phenols from coal tar or coal hydrogenation fractions. Substituted phenols, such as chlorophenols may also be used.

Mononuclear polyhydric phenols may also be used, such as resorcinol, hydroquinone and phloroglucinol. A mononuclear phenol may be defined as a phenol in which all the phenolic hydroxyl groups are attached to the same aromatic ring.

In addition to the 3,9-divinylspirobi(m-dioxane), which is preferred, the following unsaturated acetals may also be used.

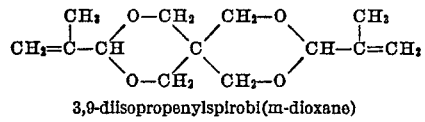

3,9-diisopropenylspirobi(m-dioxane)

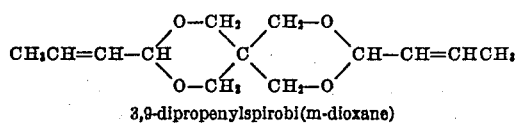

3,9-dipropenylspirobi(m-dioxane)

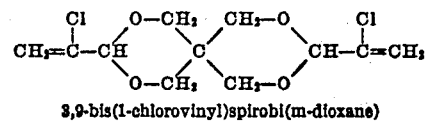

3,9-bis(1-chlorovinyl)spirobi(m-dioxane)

The polyols which are useful in forming the copolymers of this invention include any of the aliphatic polyhydric alcohols, such as ethylene glycol, propylene glycol, glycerol, polyethylene and polypropylene glycols, 1,2,4-butane-triol, butylene glycol, pentamethylene glycol, hexanediol-1,6, 2-ethylhexanediol-1,3, 1,4-butanediol, trimethylolethane and trimethylolpropane. Of these, the diols are more useful in imparting flexibility and toughness to the cured resins. Mixtures of alkoxy-substituted terminal diols having a minimum of seven carbon atoms between the terminal hydroxyl groups, as disclosed in Guest and Stansbury application Serial No. 577,492, filed April 13, 1956, and assigned to the same assignee as the present application, are also useful.

The cured resins from the phenol, polyol and 3,9-divinylspirobi(m-dioxane) are bubble-free and, in the absence of fillers usually translucent to transparent. After curing, the resins are thermoset, insoluble and infusible. Shrinkage, on molding, is low and the molded pieces are tough, impact-resistant and easy to machine. If cured in contact with glass, a good resin to glass bond is obtained.

Such copolymers of the dialkenylspirobi(m-dioxane) and the mixture of polyols and phenols are useful in shell molding and as a binder for abrasive particles in making grinding wheels. Their adherence to glass indicates utility in making laminates from glass fiber and glass fabric. The fact that no water or other volatile by-product is liberated during curing gives the copolymers of this invention a decided advantage over conventional phenolic resins in potting, coating, encapsulating and casting applications. In general, these new resins can be used in many of the applications now served by conventional phenolic, epoxy or polyester resins. The electrical properties of the new copolymers are superior to those of conventional unfilled phenolic resins, and are superior in some respects to electrical grade mica-filled phenolics.

The new copolymers are particularly valuable as molding compositions, and the fact that they release no gases or fumes in molding give them a pronounced advantage over the conventional novolac resin cured with hexamethylenetetramine, enabling low pressure molding techniques to be employed and insuring the formation of bubble-free molded articles. Various fillers, such as wood flour, diatomaceous earth and asbestos may be used. Also, in such applications, particularly where iron, aluminum or other metal fillers are employed, it is desirable to mix in the composition catalysts of a special type, which releases its acid at molding temperatures. In this manner stable molding compositions may be prepared. Such catalysts are the dialkyl sulfates, such as dimethyl, diethyl, diisopropyl and di-secondary butyl sulfates. These catalysts decompose at molding temperature to release sulfuric acid which is the active catalyst.

Immersion tests on the new resins show that they have good resistance to attack by a variety of corrosive chemicals.

The following examples will serve to illustrate the invention:

EXAMPLE 1

In one experiment 19.0 grams (0.2 mole) of phenol was reacted with 5.2 grams (0.05 mole) of pentamethylene glycol, 74.2 grams (0.35 mole) 3,9-divinylspirobi(m-dioxane) and 0.30 gram (0.3 percent) of p-toluenesulfonic acid monohydrate as a catalyst. Heating these ingredients for a short time on the steam bath produced a liquid reaction product which had a gel time of 345 seconds at 150° C. Cast samples of the liquid resin were cured in shallow pans for 25 minutes at 150° C. to give discs approximately 2" in diameter. The cured samples were almost hard at 150° C., and quite hard at room temperature. They were amber, transparent, and gave a very high bounce when dropped edge first onto a concrete floor. Six-day, room temperature immersion tests on this material gave a weight gain of 0.74 percent in water, 0.64 percent in one percent aqueous sodium hydroxide, and 0.30 percent in 30 percent aqueous sulfuric acid. The specific gravity of the product was 1.227 as determined by the specific gravity column. The Barcol Hardness was 39. The weight adsorption in liquid and specific gravity values are approximately the same as for the corresponding copolymer of the phenol and spirobi compound without pentamethylene glycol. Thus, incorporation of small amounts of a glycol has no detrimental effect on the completeness of the cure but does contribute better toughness and impact strength.

The electrical properties of the cured polymers, designated "Material A" in Table I, were superior to those of unfilled phenolic resins. The volume resistivity was greater than for the best mica-filled phenolic resin molding composition.

EXAMPLE 2

In preparing another copolymer, the amount of pentamethylene glycol was increased. 19.0 grams (0.2 mole) of phenol were reacted with 10.4 grams (0.1 mole) of pentamethylene glycol and 84.8 grams (0.4 mole) of 3,9-divinylspirobi(m-dioxane) in the presence of 0.3 percent p-toluenesulfonic acid monohydrate as a catalyst. The mixture was heated on the steam bath to form a viscous, homogeneous product. A sample cured for 25 minutes in the oven at 150° C. was not quite hard at 150° C., but hardend quickly on cooling to room temperature. As in the previous example the product was amber, transparent, and tough. The Barcol Hardness was 25.

EXAMPLE 3

19.0 grams (0.2 mole) of phenol were reacted with 20.8 grams (0.2 mole) of pentamethylene glycol, and 106.0 grams (0.5 mole) of 3,9-divinylspirobi(m-dioxane) in the presence of 0.420 gram p-toluenesulfonic acid monohydrate as a catalyst. The reaction was fast and exothermic. Samples of the initial reaction product were cast into molds and cured for 50 minutes at 150° C. The cured samples were almost hard at 150° C., quite hard at room temperature. The cured product was amber, transparent and tough. It will be noted that the increased glycol content lengthened the time of cure. The effect of increasing the glycol content is to increase the toughness and flexibility of the cured polymer. The Barcol Hardness of the product was 22.

EXAMPLE 4

Copolymers can also be prepared from pentamethylene glycol, the unsaturated acetals and other phenolic materials. For example, 24.4 grams (0.2 mole) 3,5-xylenol were reacted on the steam bath with 84.8 grams (0.4 mole) of 3,9-divinylspirobi(m-dioxane), 10.4 grams (0.1 mole) pentamethylene glycol, in the presence of 0.126 gram (0.11 percent) of p-toluenesulfonic acid monohydrate as a catalyst. The resulting viscous product had a gel time of 727 seconds at 150° C. Samples of the product were cast into molds and cured for 15 minutes at 150° C. These were rather hard at 150° C., yellow in color, and transparent. Six-day room temperature immersion tests gave a weight gain of 0.89 percent in water, 0.79 percent in 1 percent aqueous sodium hydroxide, and 0.43 percent in 30 percent aqueous sulfuric acid. The specific gravity of the cured material was 1.197. The Barcol Hardness was 31. Electrical properties of the material (Material B in Table I) were measured at frequencies of 60 cycles, 1 kilocycle, and 1 megacycle, and were found superior to those of typical commercial unfilled phenolic resins, and equal or superior to mica-filled phenolic resins.

EXAMPLE 5

Another copolymer was prepared by reacting 21.2 grams (0.2 mole) of mixed cresols, 10.4 grams (0.1 mole) of pentamethylene glycol, and 84.8 grams (0.4 mole) of 3,9-divinylspirobi(m-dioxane), in the presence of 0.324 gram (0.28 percent) p-toluenesulfonic acid monohydrate as a catalyst. The gel time of this resin was 362 seconds at 150° C. Cast samples were cured 10 minutes at 150° C. They were transparent, dark amber in color, and almost hard at 150° C. The specific gravity of the cured material was 1.206. Seven-day immersion tests at room temperature gave a weight gain of 1.12 percent in water, 0.98 percent in one percent sodium hydroxide, and 0.33 percent in 30 percent sulfuric acid. The Barcol Hardness of the cured product was 29. In the following table P.F. denotes Power Factor and D.C. denotes Dielectric Constant.

a temperature higher than said reaction temperature to form a solid thermoset resin.

*Table I*

|  | 60 Cycles | | 1 Kilocycle | | 1 Megacycle | | Vol. Resistivity, Megohm-cm. |
|---|---|---|---|---|---|---|---|
|  | P.F. | D.C. | P.F. | D.C. | P.F. | D.C. |  |
| Typical Unfilled phenolics | 0.06–0.1 | 5–6.5 | 0.03–0.08 | 4.5–6 | 0.015–0.03 | 4.5–5 | $10^5$–$10^6$ |
| Mat'l A | 0.00209 | 3.54 | 0.00351 | 3.45 | 0.0189 | 3.17 | $1.50 \times 10^{10}$ |
| Mat'l B | 0.00154 | 3.37 | 0.00235 | 3.28 | 0.0144 | 3.01 | $1.94 \times 10^{10}$ |
| Mica-filled phenolics | 0.01–0.03 | 4.7–5.5 | 0.007–0.02 | 4.5–5.5 | 0.008–0.02 | 4.2–5.2 | $10^8$–$10^9$ |

What is claimed is:

1. A resinous heat reaction product of one equivalent of a mixture of a mononuclear phenol and an aliphatic polyhydric alcohol having from two to three hydroxyl groups, in which mixture the molar ratio of alcohol to phenol is from 0.25 to 1, with from 0.25 to 4 equivalents of a 3,9-dialkenylspirobi(m-dioxane) having from 2 to 3 carbon atoms in the alkenyl radical and having the double bond of the alkenyl radical in the alpha position.

2. A resinous heat reaction product of one equivalent of a mixture of phenol and an aliphatic polyhydric alcohol having from two to three hydroxyl groups, in which mixture the molar ratio of alcohol to phenol is from 0.25 to 1, with from 0.25 to 4 equivalents of a 3,9-dialkenylspirobi(m-dioxane) having from 2 to 3 carbon atoms in the alkenyl radical and having the double bond of the alkenyl radical in the alpha position.

3. A resinous heat reaction product of one equivalent of a mixture of phenol and an aliphatic polyhydric alcohol having from two to three hydroxyl groups, in which mixture the molar ratio of alcohol to phenol is from 0.25 to 1, with from 0.25 to 4 equivalents of 3,9-divinylspirobi(m-dioxane).

4. A resinous heat reaction product of one equivalent of a mixture of phenol and pentamethylene glycol, in which mixture the molar ratio of glycol to phenol is from 0.25 to 1, with from 0.25 to 4 equivalents of 3,9-divinylspirobi(m-dioxane).

5. Process for making a thermoset resin which comprises heating at a reaction temperature of 50° C. to 150° C. and in admixture with an acid catalyst one equivalent of a mixture of a mononuclear phenol and an aliphatic polyhydric alcohol having from two to three hydroxyl groups, in which mixture the molar ratio of alcohol to phenol is from 0.25 to 1, with from 0.25 to 4 equivalents of a 3,9-dialkenylspirobi(m-dioxane) having from 2 to 3 carbon atoms in the alkenyl radical and having the double bond of the alkenyl radical in the alpha position, to form a fusible resin, and heating the fusible resin at a temperature higher than said reaction temperature to form a solid thermoset resin.

6. Process for making a thermoset resin which comprises heating at a reaction temperature of 50° C. to 150° C. and in admixture with an acid catalyst one equivalent of a mixture of phenol and an aliphatic polyhydric alcohol having from two to three hydroxyl groups, in which mixture the molar ratio of alcohol to phenol is from 0.25 to 1, with from 0.25 to 4 equivalents of 3,9-divinylspirobi(m-dioxane) to form a fusible resin, and heating the fusible resin at a temperature higher than said reaction temperature to form a solid thermoset resin.

7. A fusible, heat-hardenable composition of matter comprising the heat reaction product of one equivalent of a mixture of a mononuclear phenol and an aliphatic polyhydric alcohol having from two to three hydroxyl groups, in which mixture the molar ratio of alcohol to phenol is from 0.25 to 1, with from 0.25 to 4 equivalents of a 3,9-dialkenylspirobi(m-dioxane) having from 2 to 3 carbon atoms in the alkenyl radical and having the double bond of the alkenyl radical in the alpha position, in combination with an acid catalyst.

8. A fusible, heat-hardenable composition of matter comprising the heat reaction product of one equivalent of a mixture of phenol and pentamethylene glycol, in which mixture the molar ratio of glycol to phenol is from 0.25 to 1, with from 0.25 to 4 equivalents of 3,9-divinylspirobi(m-dioxane), in combination with an acid catalyst.

References Cited in the file of this patent

UNITED STATES PATENTS

| 2,401,776 | Rothrock | June 11, 1946 |
| 2,687,407 | Orth | Aug. 24, 1954 |

FOREIGN PATENTS

| 868,351 | Germany | Feb. 23, 1953 |